United States Patent [19]

Widrow

[11] 4,365,322
[45] Dec. 21, 1982

[54] APPARATUS AND METHOD FOR DETERMINING THE POSITION OF A GAS-SATURATED POROUS ROCK IN THE VICINITY OF A DEEP BOREHOLE IN THE EARTH

[76] Inventor: Bernard Widrow, 860 Lathrop Dr., Stanford, Calif. 94305

[21] Appl. No.: 141,270

[22] Filed: Apr. 18, 1980

[51] Int. Cl.³ .................. G01V 1/40; G01V 1/20; G01V 1/28
[52] U.S. Cl. ...................... 367/32; 367/49; 181/106
[58] Field of Search ............... 367/14, 25, 30, 32, 367/37, 47–49, 81, 86, 57; 181/106

[56] References Cited

U.S. PATENT DOCUMENTS

| | | | |
|---|---|---|---|
| 2,062,151 | 11/1936 | Weatherby | 367/86 |
| 2,569,411 | 9/1951 | Ellis | 367/37 |
| 2,803,305 | 8/1957 | Behning et al. | 367/37 |
| 2,933,144 | 4/1960 | Scott et al. | 367/81 |
| 3,588,800 | 6/1971 | Moore et al. | 367/86 |
| 3,690,164 | 9/1972 | Gabillard et al. | 367/14 |
| 3,739,871 | 6/1973 | Barley | 367/14 |
| 3,881,168 | 4/1975 | Fan et al. | 367/48 |
| 3,909,776 | 9/1975 | Broding et al. | 181/106 |
| 3,921,126 | 11/1975 | Waters | 367/47 |
| 3,929,143 | 12/1966 | Russell | 367/30 |
| 4,009,609 | 3/1977 | Sayer et al. | 367/25 |
| 4,207,619 | 6/1980 | Klaueness | 181/106 |
| 4,298,967 | 11/1981 | Hawkins | 367/57 |

FOREIGN PATENT DOCUMENTS

| | | | |
|---|---|---|---|
| 1569581 | 6/1980 | United Kingdom | 367/57 |
| 1569582 | 6/1980 | United Kingdom | 367/57 |
| 693299 | 11/1979 | U.S.S.R. | 367/49 |

OTHER PUBLICATIONS

Ritch et al, "Evidence of Low Free Gas . . . Sands", 6/12/76, pp. 1–11, Trans. SPWLA 17th Annual Logg. Symp.

*Primary Examiner*—Nelson Moskowitz
*Attorney, Agent, or Firm*—Flehr, Hohbach, Test, Albritton & Herbert

[57] ABSTRACT

Apparatus for determining the position of a gas-saturated porous rock in the vicinity of a deep borehole in the earth. The apparatus includes a source of seismic waves of selected characteristic, positioned at a selected point in the borehole, with an array of geophones positioned on the earth in known positions around the borehole. These geophones are adapted to receive the seismic waves generated by the source in the borehole, after traveling downwardly through the earth to the formation and reflected from the formation, and to produce corresponding facsimile electrical signals. If the seismic waves from the source in their downward movement impinge upon a gas-saturated porous rock they will reflected, and therefore the signals from the geophones which are in path of the reflected waves will show a change of character. If the reflection is observed while drilling at two or more known depths, the depth, azimuth, and radial position from the borehole of the gas-saturated rock can be determined. Using the principle of reciprocity, the same measurements can be made by interchanging the positions of seismic source and receiving sensor.

5 Claims, 10 Drawing Figures

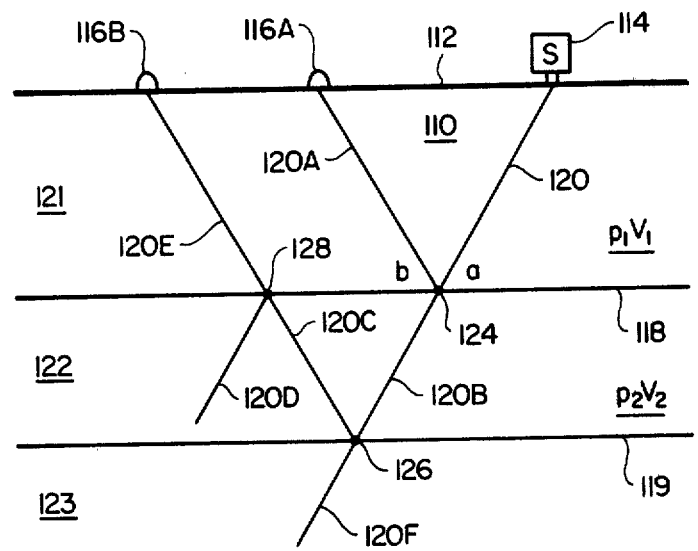
FIG_1
*(PRIOR ART)*
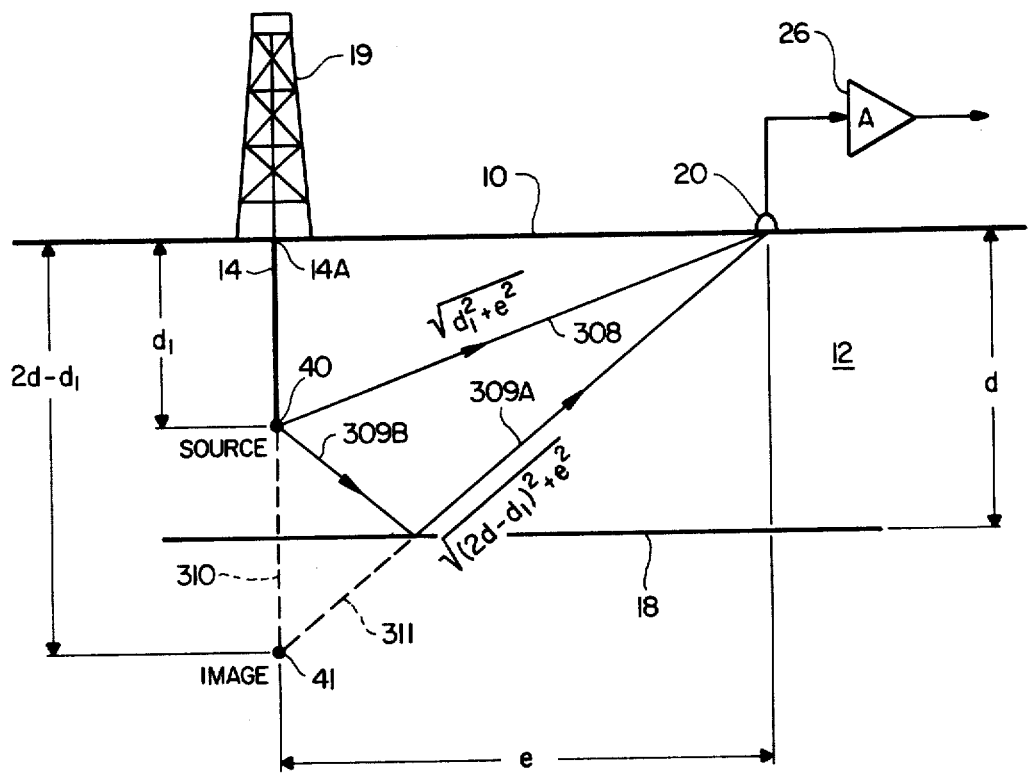
FIG_2

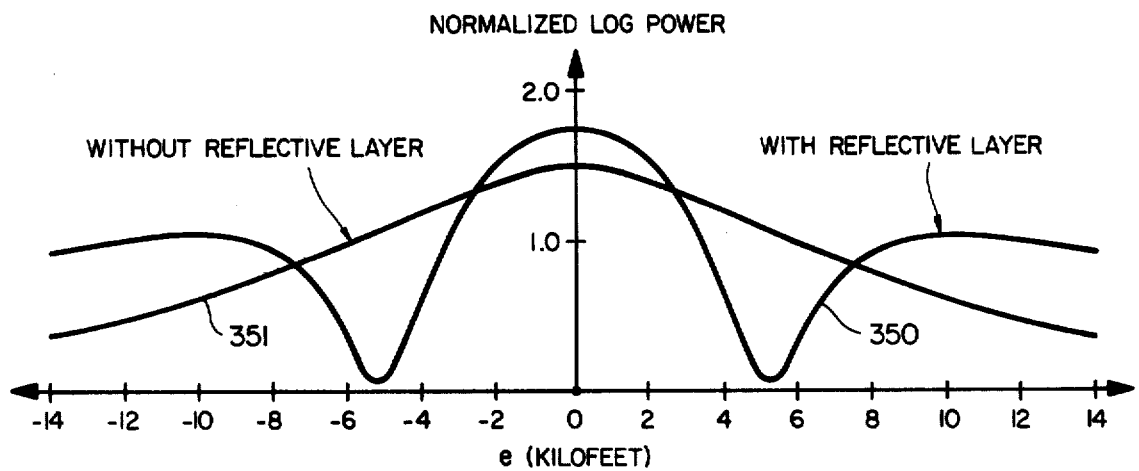
FIG_3
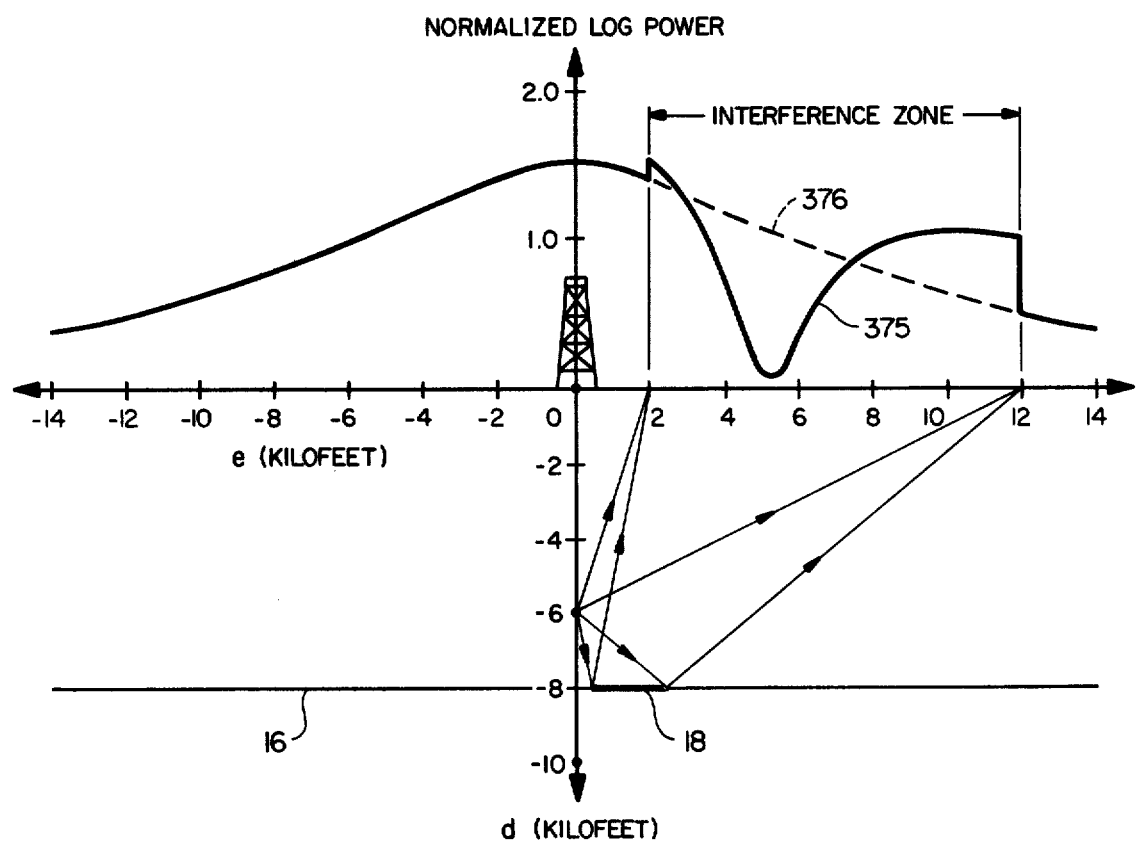
FIG_4

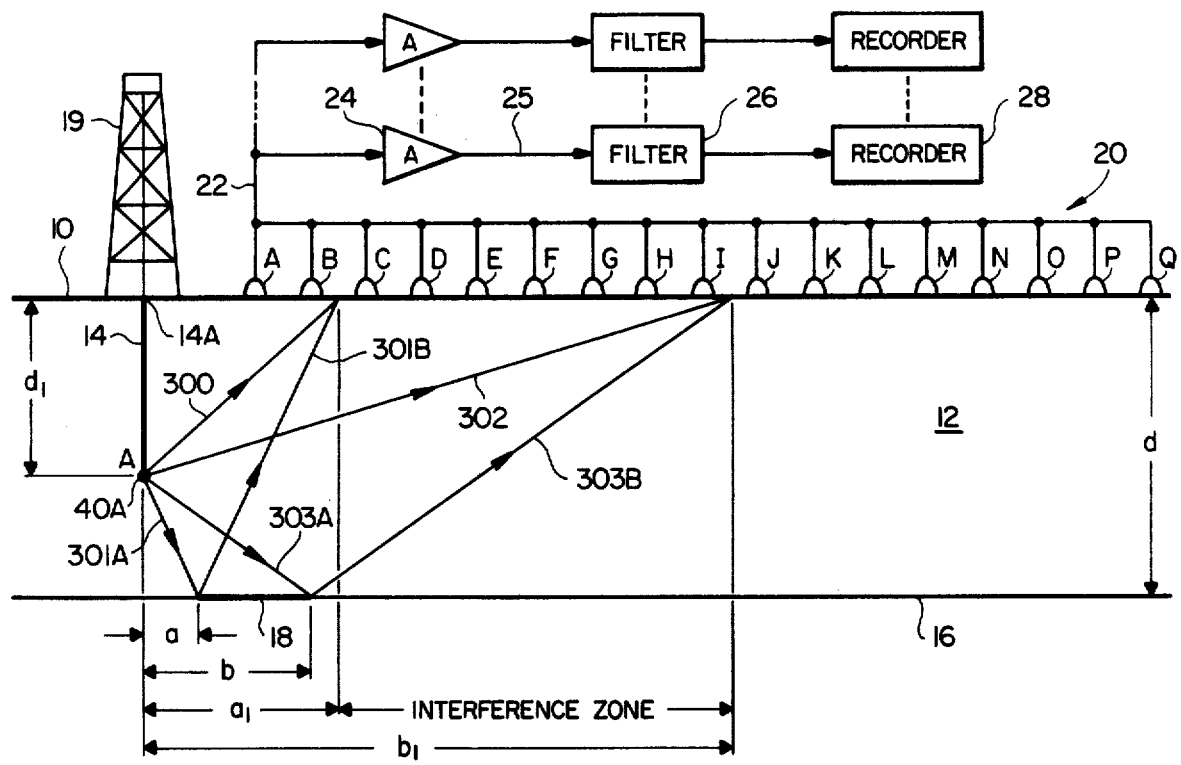
*FIG_5A*
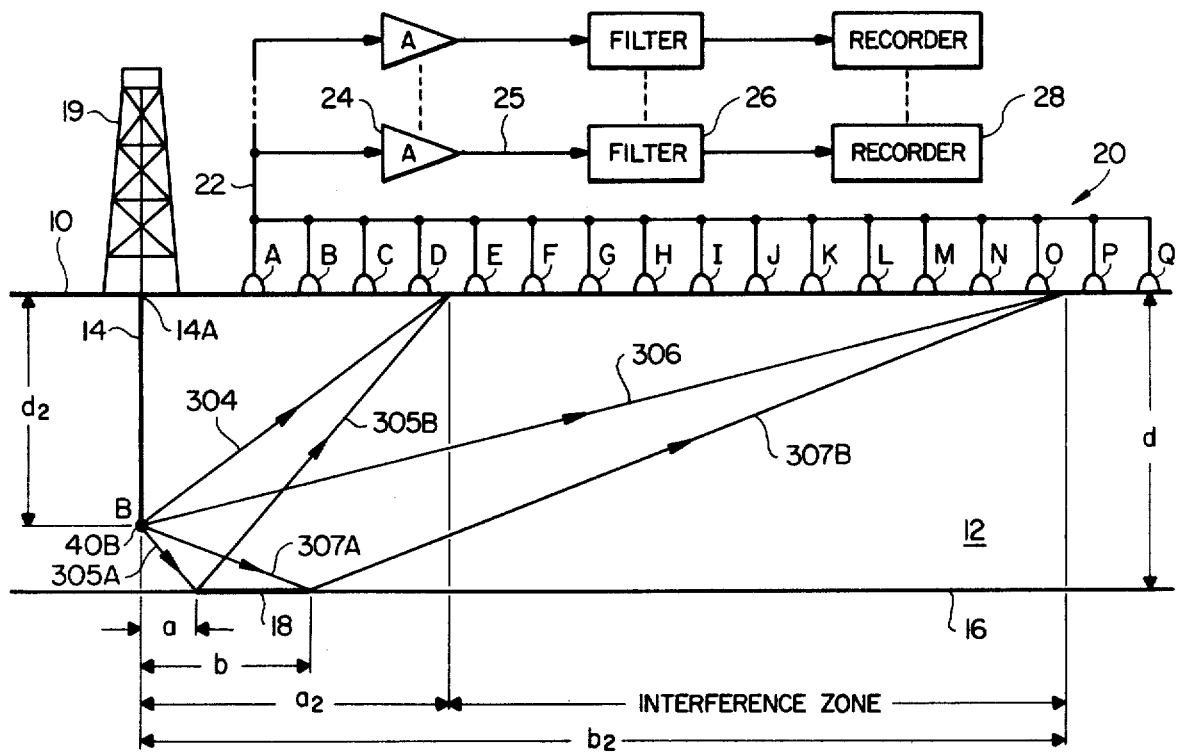
*FIG_5B*

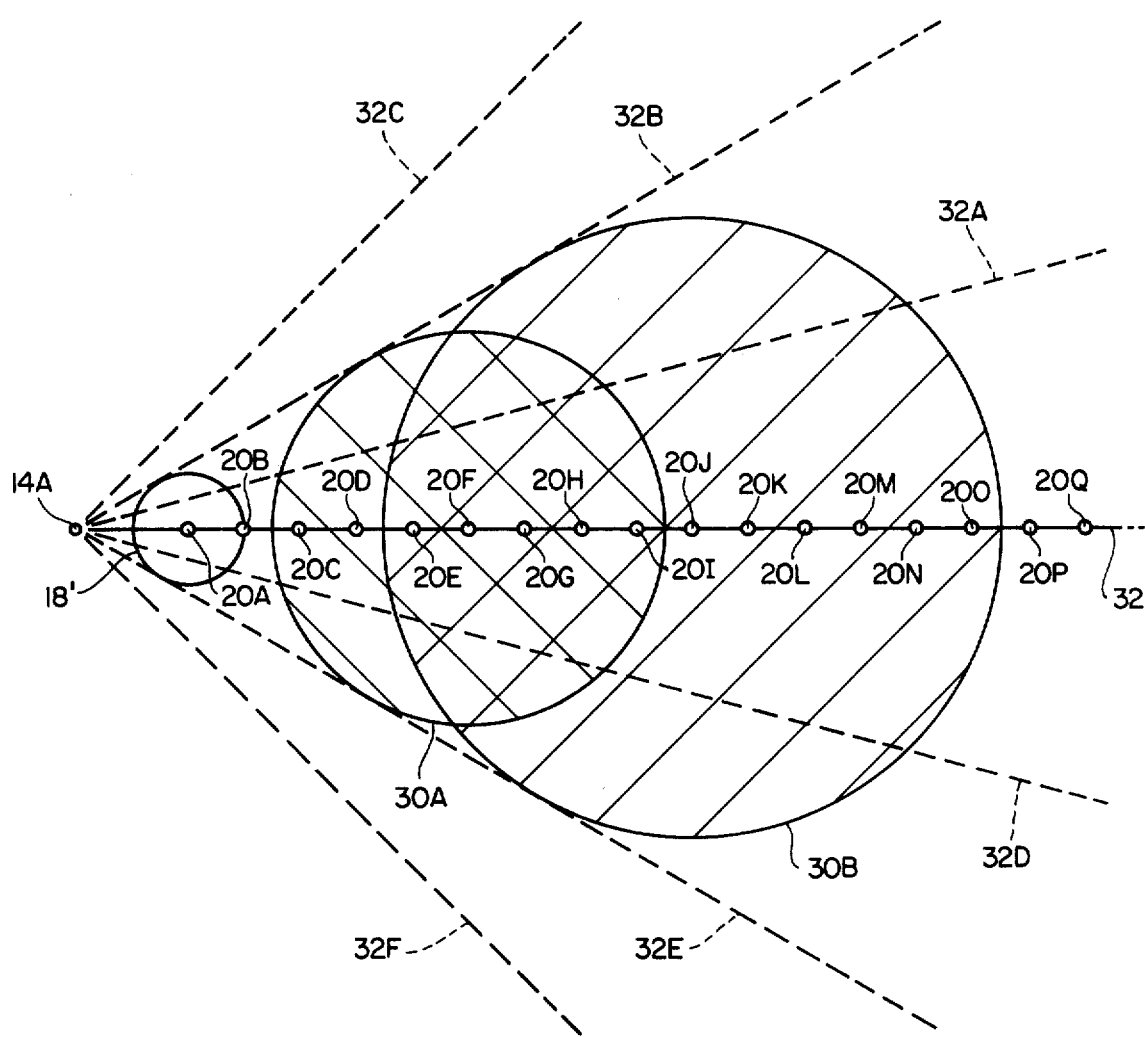
FIG_6
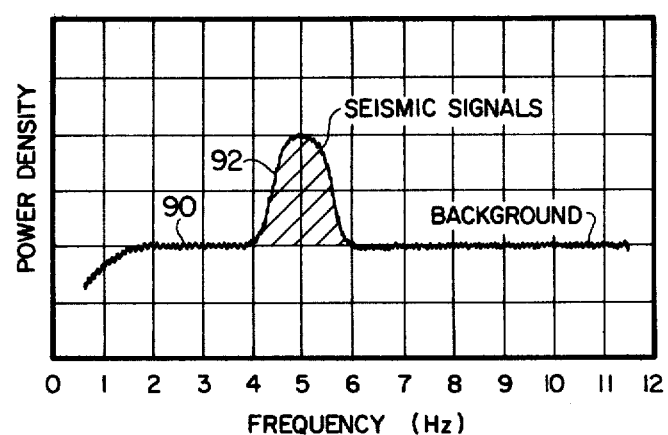
FIG_8

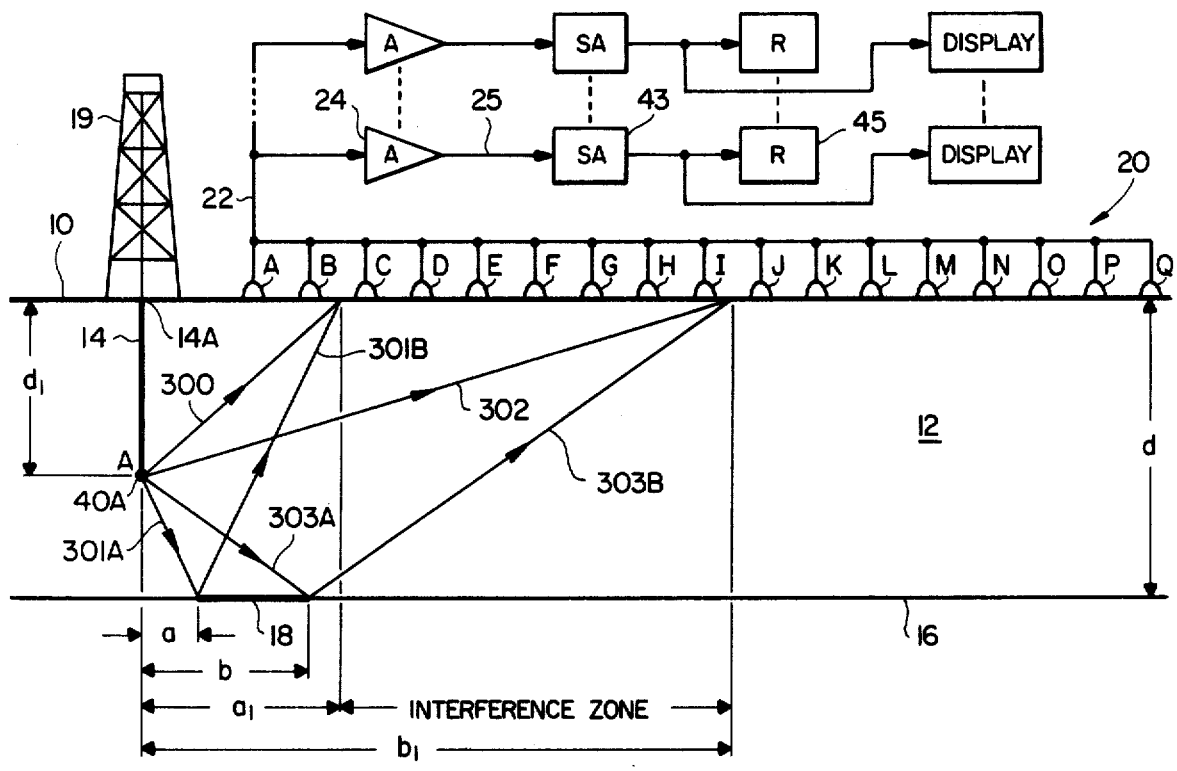
FIG_7A
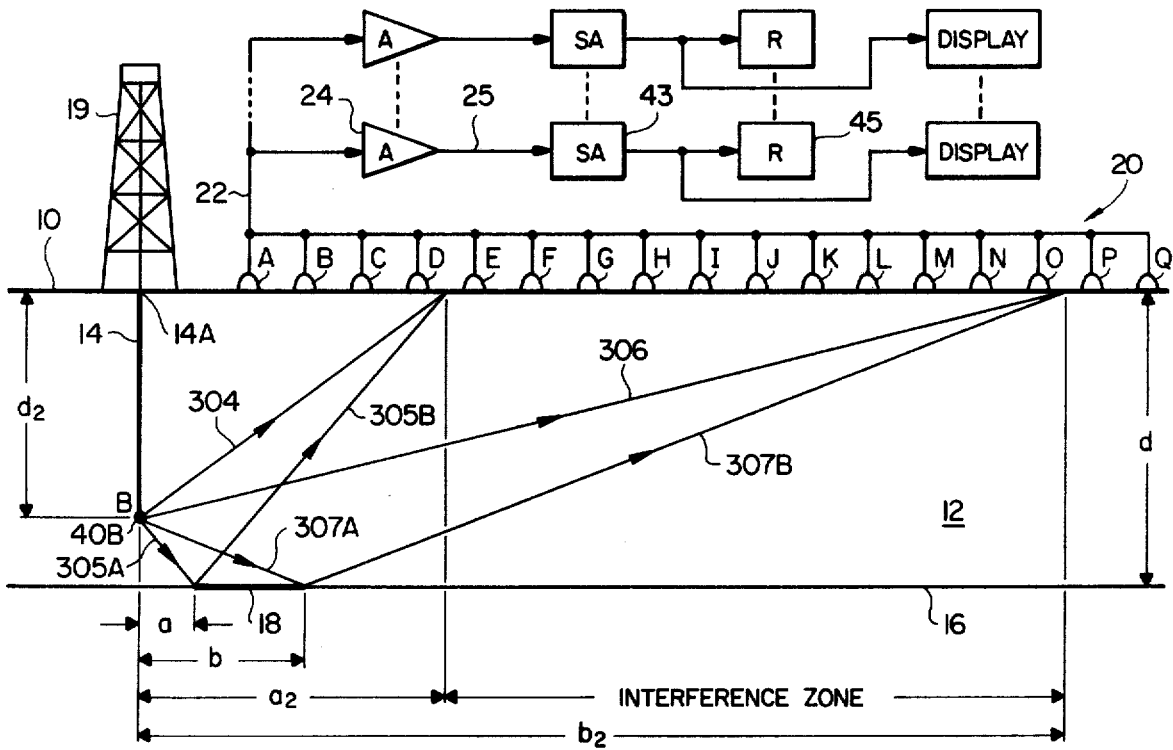
FIG_7B

APPARATUS AND METHOD FOR DETERMINING THE POSITION OF A GAS-SATURATED POROUS ROCK IN THE VICINITY OF A DEEP BOREHOLE IN THE EARTH

This invention lies in the field of mapping of geologic formations, which have gas-saturated porous rock, sand or the like.

More particularly, it concerns apparatus of which, while drilling a borehole, measurements can be made which will indicate the presence of a gas-saturated porous rock formation below the position of the seismic source, including its depth, azimuth and radial distance from the borehole. The seismic source could be the natural emanations from the drill bit while boring into the earth, or could be one of a number of devices that could be located at the drill bit or lowered by some other means into the borehole.

In the field of exploration for oil and gas, there has been great interest in the so-called "Bright Spot" method of location of gas-filled porous formations by the seismic process. Although this method of location of gas zones in porous rocks is not infallible, the bright spot technique has helped in an important way to locate gas reservoirs in the subsurface.

The bright spot method is based upon seismic wave propagation theory and practice discussed in connection with FIG. 1 and follows from the well known bright spot technology which has been widely described in the literature and needs no further description at this time. Current text books in seismic exploration can be referred to for full details of the process of reflection and transmission of seismic energy through geological formations, and particularly reflection from gas-filled porous rock formations.

One important point of difference between this invention and the conventional bright spot process is that the conventional bright spot operation is carried out with a surface seismic source and a surface array of geophones. With the conventional seismic process, seismic energy starting from a near surface source passes downwardly and is reflected upwardly at the gas-filled porous rock reservoir to one or more of the geophones. Because of the change of acoustic impedance, seismic waves traveling downwardly from a dense rock to the less dense gas-filled rock will have a large reflection coefficient. Therefore, those rays which are reflected from the gas-filled zone will be of larger amplitude than those rays reflected from the adjacent areas of the rock formation. The objective is to look for large reflections.

In the case of this invention, because of the transmission upwardly through the earth and by reflection from the gas-filled porous rock from below, energy from two paths will propagate to the surface. The energy from the two paths will be of different phases and will combine constructively or destructively to create an interference pattern. There will be some places with more, some places with less amplitude energy in the interference zone and, therefore, the objective will be to look for seismic signals of anamolous amplitude and energy in the interference zone.

There are other differences between this invention and conventional bright spot technology. This method involves the use of a seismic source deep in the earth, near to the gas pool to be detected. The conventional method involves application of the source at the surface, requiring long two-way travel to the target zone. The method of this invention places the source above the target layer but below many other layers that are of no interest but cause multiple reflections and confuse the reflections of interest when using conventional techniques. The method of this invention uses geometric angularity to detect and measure the position and depth of the target zone. Conventional techniques measure depth by time delay and measure position by beam-forming techniques which, for practical reasons, lack resolution. This invention uses an existing source and does not require a special seismic source. The source used by this invention is applied below the surface weathered layer and thereby couples better to the earth. The signal processing methods of this invention are able to use a continuous seismic source rather than a pulsed source. The energy level of this source need not be high, since signal to noise ratio can be enhanced by time averaging or stacking.

A considerable volume of prior art exists in the field of drill bit logging. In this art, a seismic source is built into the drilling apparatus near the bit, so that seismic signals can be transmitted without substantial interruption of the drilling process. These seismic signals are then detected at the surface of the earth by a two-dimensional array of geophones. Measurements are made of the arrival times of the seismic signals at geophones located at the surface. From these measurements the travel times of the seismic waves from the source to the geophones are determined. Knowing the positions of the geophones with respect to the mouth of the borehole, it is possible to calculate the position of the bit in the earth in three dimensions at any time. An example of the prior art bit logging is the U.S. Pat. No. 4,003,017. In the bit logging art, the critical measurement is travel time of the seismic waves and the character or energy of the geophone signals is of no importance. In the present invention, the opposite is true. The critical measurement is character or energy of the geophone signals.

It is an object of this invention to provide an apparatus and method for making measurements in the earth during the process of drilling a borehole as a result of which pockets or reservoirs of gas-filled porous rock at some distance below the drill bit in the vicinity of the borehole can be located.

It is a further object of this invention by the use of a plurality of measurements made in the radial vicinity of the borehole with a seismic source at different depths in the borehole to make measurements which can identify the presence and position of gas-saturated rock reservoirs.

It is still a further object of this invention to make measurements at a selected series of depths while drilling in a borehole to determine the depth and the azimuthal and radial positions of a gas-filled porous reservoir rock.

It is another object of the invention to provide an apparatus and method for making measurements during on-shore or off-shore drilling.

These and other objects are realized and the limitations of the prior art are overcome in this invention by providing a seismic source as part of the drilling equipment, at or near the bit, and to provide either a single sensor or a plurality of seismic wave sensors, detectors, or geophones positioned on or near the surface of the earth in selected positions connected through appropriate amplifiers which can be of a conventional type to a seismic recording system. By measurements of the amplitude, energy, character, etc. of the received signals from each of a plurality of positions of the geophone(s), determination can be made as to whether there is a gas-filled porous rock formation which is reflecting energy from the seismic source at the bottom of the drill pipe to one or more of the geophones at the surface. The presence of such a geologic formation would be indicated by variation in amplitude or energy of the received signals when the reflected seismic wave creates an interference pattern with the direct wave from the seismic source to the surface and the geophones are in the resulting interference pattern at the surface.

It will become apparent from the description to follow that different types of seismic sources can be used. One source can be the "tricone bit" which is a conventional rock bit used for drilling deep boreholes in the earth. There is present in the noise generated in the vicinity of the cutting tips of the rock bit a pronounced third harmonic signal. The frequency of this signal is three times the frequency of rotation of the drill pipe in the hole, corresponding to the three cones of the rock bit. Other harmonics of the drill rotation speed have also been observed such as the sixth harmonic and others. All of the harmonics are potentially useful as signal components.

Of course, other types of seismic sources can be built into the drilling apparatus at the bit or in the drill collars near the bit. Such a source can be, for example, a set of jars or other similar equipment such as described in U.S. Pat. No. 4,003,017.

Another seismic source can be one that comprises means responsive to the flow of drilling mud through the drill stem while the borehole is being drilled. One example of that type of source is described in the U.S. Pat. No. 4,040,003. Still another type of seismic source can be a percussion sub in the drill string in cutting operation on the bottom of the borehole such as has been used in drilling hard rock formations.

It will also become apparent that many types of sensing arrays can be used, such as arrays extending radially outward from a point near the mouth of the borehole. Alternatively, the sensing arrays can be in a circle, the center of which is at the mouth of the borehole. The sensing array might be spaced, in a selected manner, in one or more concentric circles. The sensing arrays can also be irregular in geometry. A single geophone can be moved from point to point to form the sensing array or a plurality of geophones or sensors may be used to form the sensing array.

A better understanding of the principles and details of the invention will be evident from the following description taken in conjunction with the appended drawings in which:

FIG. 1 is a prior art illustration of reflection and transmission of seismic waves.

FIG. 2 illustrates the interference effect between direct and reflected rays.

FIG. 3 is a plot of normalized logarithm of power as a function of distance with and without a reflective layer.

FIG. 4 is a plot of the normalized logarithm of power as seen at the surface for an illustrated well depth and gas zone location.

FIG. 5 shows schematically one embodiment of this invention including sharply tuned band pass filtering.

FIG. 6 illustrates in plan view the array of sensors or geophones of FIG. 2.

FIGS. 7A-7B show schematically another embodiment of this invention employing spectral analysis to determine signal intensity and illustrates the interpretation of received signals to determine precise position of the gas-filled formation.

FIG. 8 illustrates the use of power spectra in the interpretation of intensity of received signals.

The present invention will be better understood by reviewing briefly the principles of the transmission and reflection of seismic waves at geologic interfaces in the earth. Referring to FIG. 1, the earth 110 having a surface 112 is shown having three geologic formations, 121 at the surface, 122 below the formation 121 with an intervening contact or interface 118, and a third formation 124 in contact with 122 at an interface 119.

A seismic source 114 is set up at the surface and a plurality of sensors such as geophones 116A, 116B, etc. are spaced from the source 114. By conventional representation, a ray of seismic energy 120 passes downwardly to reflection point 124 at the interface 118 where generally part of the energy is transmitted across the interface 118 as ray 120B and part is reflected as upwardly reflected ray 120A.

Again, at interface 119 part of the energy of ray 120B is transmitted at reflection point 126 across the interface 119 as ray 120F and part is reflected upwardly as ray 120C.

Part of the upwardly traveling ray 120C at reflection point 128 is transmitted across the interface 118 from below as the ray 120E and part is reflected downwardly as ray 120D, and so on.

There are several conditions in this process that are well known. First, at the reflection points the angles of incidence and reflection are equal. This occurs at all reflection points such as 124, 126, 128 and so on. At point 124 the angle a and b are equal. Second, the division of energy as between the incident wave 120 and the reflected wave 120A is determined by the relations that follow.

The reflection coefficient R is $$R = \frac{A_r}{A_I} = \frac{\rho_2 V_2 - \rho_1 V_1}{\rho_2 V_2 + \rho_1 V_1}$$

The reflection coefficient is the ratio of the amplitude of the reflected wave to the amplitude of the incident wave.

$A_r$ is the amplitude of the reflected wave.

$A_I$ is the amplitude of the incident wave.

$\rho_1$ is the density of formation 1 from which the wave is incident onto the interface.

$\rho_2$ is the density of formation 2 into which the wave is transmitted.

$V_1$ is the velocity of seismic wave transmission in formation 1.

$V_2$ is the velocity of seismic wave transmission in formation 2.

The ratio of the reflected wave energy to the incident wave energy is given by the square of the reflection coefficient, $$\frac{E_R}{E_I} = R^2 = \left( \frac{\rho_2 V_2 - \rho_1 V_1}{\rho_2 V_2 + \rho_1 V_1} \right)^2$$

By conservation of energy, the energy of the transmitted wave in formation 2 is given by $$E_t = E_I - E_R.$$

The quantity $\rho V$ is called the acoustic impedance of a selected geologic formation. Such formations in the earth have independent densities and velocities. Thus, two different formations may have the same acoustic impedance, yet be considerably different in $\rho$ and $V$. The reflection coefficients R are generally small at the interfaces so that sufficient energy can be present in deep reflections after having been traversing many hundreds of geologic interfaces.

However, where the reflection takes place between a solid and a liquid, because of the disparity in density and velocity, the reflection coefficient can be quite large. Also where the interface is between rock and air or other gas such as at the surface of the earth, the reflection coefficient can be almost 100 percent and the energy transmitted through the interface is correspondingly very small.

In accordance with the present invention, seismic waves are generated in the borehole and detected at a number of locations at the surface of the earth. The seismic waves received at the surface include both waves transmitted through the earth directly from the source and waves which are generated by the source and reflected from gas filled porous rocks. The seismic waves will combine constructively and destructively to create an interference pattern at the surface.

Interference phenomena are well known in the theory of optics, acoustics, and radio propagation. The particular circumstances that give rise to interference within the scope of this invention are pictured in FIG. 1. The seismic source 40 at the drill bit, located deep in the earth at a depth $d_1$, emanates seismic radiation directly to geophone 20, located on the surface of the earth 10 at a distance e from the mouth of the borehole 14A along ray path 308. Source 40 also radiates energy downwardly whereupon reflection takes place at the gas formation layer 18, assumed to be horizontal and extending everywhere at a depth d. The reflected ray path is 309A, 309B. The angle of incidence equals the angle of reflection along this path. The reflected ray appears as if it were a direct ray from an "image" source 41.

Wherever geophone 20 is placed on the surface 10 within range of the borehole, interference will take place as the direct and reflected rays combine to form the net seismic response at the chosen location. Since the various harmonic signals radiated by source 40 are known to be narrowband, interference phenomena can be described in terms of the radiated signal being sinusoidal. If the third harmonic frequency is designated as $\omega_3$ radians per second, an analysis of the third harmonic response at geophone 20 can be made.

Assume that the third harmonic seismic wave at a unit distance from source 40 along the direct ray path 308 is given by $$\alpha \sin \omega_3 t \quad (1)$$

The power of this wave is known to be $\alpha^2/2$. Neglecting attenuation but taking into account the important effect of energy spreading, the power drops with the square of distance while the amplitude drops only with first power of distance. Accordingly, the direct seismic wave component at geophone 20 is $$\frac{\alpha \sin \omega_3 (t - DD)}{\sqrt{d_1^2 + e^2}} \quad (2)$$

The distance along path 308 is $\sqrt{d_1^2 + e^2}$, obtained by application of the Pythagorean theorem. The propagation delay time along the direct path from source to geophone is designated by DD.

Let the third harmonic seismic wave at a unit distance from source 40 along the downward part of the reflected ray 309A be given by $$\beta \sin \omega_3 t \quad (3)$$

It is possible that $\beta$ might not be equal to $\alpha$ since source 40 may not radiate equal energy in all directions. Since the calculation of the seismic wave due to reflection is made easier using the concept of the image source, let image source 41 radiate a wave $$\beta \sin \omega_3 t \quad (4)$$

at unit distance along path 311. It is now apparent that the reflected wave at geophone 20 is $$\frac{R\beta \sin \omega_3 (t - DR)}{\sqrt{(2d - d_1)^2 + e^2}}, \quad (5)$$

where R is the reflection coefficient, and DR is the propagation delay from image source 41 to geophone 20 along path 311, 309B. The distance along this path is $$\sqrt{(2d - d_1)^2 + e^2}, \quad (6)$$

as one can verify from the geometry of FIG. 2. The net seismic wave at geophone 20, the sum of the direct and reflected waves is therefore, $$\frac{\alpha \sin \omega_3 (t - DD)}{\sqrt{d_1^2 + e^2}} + \frac{R\beta \sin \omega_3 (t - DR)}{\sqrt{(2d - d_1)^2 + e^2}}. \quad (7)$$

The geophone output signal will be proportional to this quantity. In obtaining (7) by adding the two waves, a tacit assumption has been made that the angular difference between the direct and reflected rays at geophone 20 is small, otherwise the effects of direction of propagation on geophone response would need to be accounted for.

The propagation delay of the direct path can be expressed in terms of the average propagation speed c. Accordingly, $$DD = \frac{\sqrt{d_1^2 + e^2}}{c}. \quad (8)$$

The propagation delay of the reflected ray path is $$DR = \frac{\sqrt{(2d - d_1)^2 + e^2}}{c}. \quad (9)$$

The interference phenomena of FIG. 2 are completely represented by relation (7), with the time delays given by (8) and (9).

To determine the signal power and how it varies as the geophone placement is varied, it is convenient to re-express (7) as $$\left[ \frac{a}{\sqrt{d_1^2 + e^2}} + \frac{R\beta \cos\omega_3(DD - DR)}{\sqrt{(2d - d_1)^2 + e^2}} \right] \sin\omega_3(t - DD) + \tag{10}$$

$$\left[ \frac{R\beta \sin\omega_3(DD - DR)}{\sqrt{(2d - d_1)^2 + e^2}} \right] \cos\omega_3(t - DD). \tag{10}$$

The power of the third harmonic wave is half the sum of the squares of the bracketed terms of (10), and is given by $$\frac{a^2}{2(d_1^2 + e^2)} + \frac{R^2\beta^2}{2[(2d - d_1)^2 + e^2]} + \tag{11}$$

$$\frac{R\beta a \cos \dfrac{\omega_3}{c} \left[ \sqrt{d_1^2 + e^2} - \sqrt{(2d - d_1)^2 + e^2} \right]}{\sqrt{(d_1^2 + e^2)[(2d - d_1)^2 + e^2]}}.$$

The dependence of the third harmonic signal power on the geophone positional parameter e is complicated and difficult to visualize. The effects of both energy spreading and interference are evident. In order to gain an understanding of this function, it is useful to plot (11) versus e under a set of conditions that might be encountered in practice, such as:

$d_1 = 4,000$ feet
$d = 6,000$ feet
$c = 15,000$ feet per second
$R = 0.2$
$\omega_3 = 10\pi$ radians per second (3rd harmonic of 100 RMP shaft rate)
$\alpha = 1$
$\beta = 5$ For these conditions, a plot of seismic wave power vs. e is shown in FIG. 3. The log of the function is plotted on a normalized scale, curve 350.

If the reflecting layer 18 were not present, the seismic power at geophone 20 would only be due to the direct wave which is represented by expression (2). The power of this direct wave is $$\frac{a^2}{2(d_1^2 + e^2)} \tag{12}$$

This is simply the first term of expression (11) and represents the power when the reflection coefficient R is zero. This function is also plotted in FIG. 3. It is curve 351, plotted on the same normalized log scale.

Without reflected radiation, energy spreading causes the seismic intensity of the direct wave to drop off symmetrically and monotonically with distance from the borehole in accord with curve 351. With reflected radiation, interference between direct and reflected rays causes "anomalous" variations in seismic intensity with distance from the borehole. This is the basis for the detection of the interference zone.

In FIG. 4, seismic power as a function of e is governed by expression (11) in the interference zone and is governed by expression (12) outside the interference zone. The interference zone is caused by reflection from gas pool 18, which is typically a small segment of formation 16. The change in function, indicating the presence of the interference zone, can be noted by measuring seismic power along a line at many distances from the borehole while drilling takes place using geophones and band pass filters as in FIG. 5 or by using geophones and spectrum analysis as in FIG. 7, and by plotting the power (or more conveniently the logarithm of the power) versus e as is done in FIG. 4. The anomaly due to reflected energy appears as the difference between the measured log power curve 375 and the theoretical dotted curve 376 (based on expression (12), assuming no reflection).

Now having a method for detecting the interference zone, the remaining task is to relate its geometrical parameters to the parameters of the gas pool. Referring either to FIG. 5A or FIG. 7A, it is clear from elementary geometry that $$a_1 = a + a\left(\frac{d}{d - d_1}\right). \tag{13}$$

This is based on the physical concept that angle of reflection must equal angle of incidence. Similarly, $$b_1 = b + b\left(\frac{d}{d - d_1}\right). \tag{14}$$

These relations apply when the drill bit, the seismic source, is at position A. Referring either to FIG. 5B or FIG. 7B, with the seismic source at position B, it follows in like manner that $$a_2 = a + a\left(\frac{d}{d - d_2}\right), \text{ and} \tag{15}$$

$$b_2 = b + b\left(\frac{d}{d - d_2}\right). \tag{16}$$

Clearing fractions in equations (13) and (15) yields $$\begin{cases} a_1 d + d_1 a - 2ad = a_1 d_1 \\ a_2 d + d_2 a - 2ad = a_2 d_2. \end{cases} \tag{17}$$

The seismic source depths $d_1$ and $d_2$ are known. Also, $a_1$ and $a_2$ are known parameters of the two interference zones associated with the two source depths. There are two unknowns, a and d, and two equations to be solved. These equations are nonlinear in a and d, but can be readily solved by standard iterative techniques by computer or by hand calculation. Now clearing fractions in equations (14) and (16) yields $$\begin{cases} b_1 d + d_1 b - 2bd = b_1 d_1 \\ b_2 d + d_2 b - 2bd = b_2 d_2. \end{cases} \tag{18}$$

These equations can be solved to yield d and b. The value of d found from (17) should agree with that found from (18). A more accurate value of d could be obtained by averaging the two values of d. This could be substituted back into (17) to get an improved value of a and substituted back into (18) to get an improved value of b.

Although it is not necessary to take data at three or more source depths, this could be done to yield results having less experimental error. Obtaining another set of equations like (13), (14) or like (15), (16) but for a third depth, some algebraic manipulation yields $$\begin{cases} (a_1 - a_3)d + (d_1 - d_3)a = a_1d_1 - a_3d_3 \\ (a_2 - a_3)d + (d_2 - d_3)a = a_2d_2 - a_3d_3, \end{cases} \quad (19)$$

$$\begin{cases} (b_1 - b_3)d + (d_1 - d_3)b = b_1d_1 - b_3d_3 \\ (b_2 - b_3)d + (d_2 - d_3)b = b_2d_2 - b_3d_3. \end{cases} \quad (20)$$

Equations (19) are linear and directly solvable to obtain a and d. Equations (20) are also linear and can be solved directly to obtain b and d. Once again, the values of d can be averaged to improve accuracy, and substitution back into (19) and (20) will yield more accurate values of a and b respectively.

These methods of finding a, b, and d along a vertical cross section through the earth can be used in like manner with many crossections to map out a three dimensional picture of the gas pool.

In summary, this invention makes use of a combination of seismic radiation reflecting from the gas-filled portion of the formation of interest and seismic radiation propagating directly upwardly from the deep seismic source to the surface.

What has been described is a system for making measurements at surface geophone arrays from a selected seismic source, at or near the bit in a dril string while drilling in a deep borehole. The measurements involve the signal character, amplitude, or energy arriving from the source to each of the geophones in one or more arrays. If there is a gas-filled porous rock 18 present at some depth d below the source 40, then one or more of the geophones will be in the interference zone of this gas-filled reservoir. Thus, the signals received from those geophones will be modified in accordance with the bright spot theory and thus can be identified as being in the interference zone of such a reservoir. Thus, the radial location, size and depth of the reservoir can be determined by specific measurements made for at least two different depths of the seismic source.

However, the optimum method of carrying out this invention is to use a single source and a great many sensors or geophones, all of which are recorded simultaneously. In such a case, since the received signals all come from the same source at the same time, the comparisons of signals from the source are more meaningful.

Referring now to FIGS. 5A-B, there is shown in schematic form one embodiment of this invention for determining the position of gas-saturated porous rock. The surface of the earth 12 is shown by numeral 10, with a vertical borehole 14 drilled at a selected location in the earth. The mouth of the borehole is indicated by numeral 14A.

There is a horizontal geological formation 16 at a selected depth d, which may be a rock having substantial porosity. Over a limited horizontal region 18, the pores of this rock are filled with gas rather than a liquid such as oil or water. The objective of the apparatus and method of the present invention is to locate the gas-filled porous rock 18 and to determine its depth d and its lateral positions a and b relative to the borehole.

The portion of the porous rock that is filled with gas can be of many shapes and sizes, the gas being locked in a selected portion of the formation by faults, mineralization, structure, etc. as is well known in petroleum geology. For convenience and for purposes of illustrations, this gas filled rock will be assumed to be circular and will be referred to as "gas filled porous rock", "gas saturated rock", "gas pool", "gas saturated formation", "gas zone", "gas pocket", and so on. As is well known, the gas pool may lie above an oil pool and accordingly in the apparatus and method to be described is useful in identifying oil pools.

The drilling equipment, not shown in FIGS. 5A-B, would include a drilling rig 20 of conventional design, including a drill stem or drill string extending into the earth. There is a source of seismic waves 40, which will be described more fully below, in the borehole. This source 40 in FIG. 2A is labeled 40A when it is at a position A at depth $d_1$ and is labeled in FIG. 5B as 40B at position B at a lower depth $d_2$.

The source 40 creates a spherical seismic wave that moves radially outwardly and, of course, upwardly toward the surface, directly to the sensors or geophones 20A, 20B, 20C ... 20Q placed at the surface of the earth 10. In addition, the spherical seismic wave moves downwardly toward the gas pool 18. The ensuing reflected wave moves upwardly toward the surface. The geophones at the surface, being linear devices, produce output signal components which are a sum of the responses due to the direct and the reflected waves. Because of the high reflection coefficient in the cases where seismic energy passes from rock with liquid-filled pores to rock with gas-filled pores, the reflected wave could be quite strong. The reflection coefficient R will be negative because the gas-saturated rock has a lower acoustic impedance than the liquid-saturated rock above it.

In FIG. 5A, seismic wave energy is shown traveling along a direct ray 300 from source 40A to the surface. Seismic wave energy also travels from source 40A along the reflected ray path 301A, 301B to the same point on the surface. The direct and reflected seismic waves interfere with each other when arriving at the common surface point at a distance a from the mouth of the borehole. The ray path 301A, 301B just grazes the left edge of the gas pool 18. Another ray path 303A, 303B just grazes the right edge of gas pool 18 and impinges on the surface 10 at a distance $b_1$ from the mouth of the borehole.

Points on the surface located at distances between $a_1$ and $b_1$ will be in an "interference zone" where seismic energy arrives from both direct and reflected rays. Outside this zone, seismic energy arrives only via direct rays. In FIG. 5B, the source 40B is deeper in the earth. The corresponding interference zone is larger and displaced further from the borehole. Below will be described means for detecting the interference zones and from their geometric features $a_1$, $B_1$ and $a_2$, $b_2$ the important positional parameters of the gas pool a, b, d will be determined.

The interference zones will be detected by measuring and comparing geophone output signal intensities. The closer the spacing of the geophones radially and circumferentially, the sharper the location of the position of 18.

It is understood that a single sensor may be used and positioned sequentially to receive waves at the positions 20A . . . 20Q. However, it is preferable that all geophones would be recorded simultaneously and stored. Then, at later times the separate sensor signals can be processed to determine the boundaries of the interference zones.

Referring now to FIG. 6, there is shown a plan view of the surface of the earth, based on FIG. 5, indicating the mouth of the borehole 14A and a linear array 32 of geophones such as 20A, 20B . . . 20F, 20G, etc. The circle 18' indicates the plan view of the gas pool or gas zone 18. Crosshatched circles 30B and 30A indicate the extent of the interference zones at the surface due to interference between direct seismic energy and that reflecting from the gas zone 18, originating from sources 40B and 40A respectively.

It will be seen that, in view of the different positions such as A and B, which can be taken by the source 40, the interference zones 30B and 30A illustrated by the circles in FIG. 6 can be of different size and different radial position. Different groups of geophones 20 will give indications of the zone 18 at different depths of the seismic source.

It will be clear that to determine the position of a gas pool of relatively small dimensions such as 18, the spacing of the geophones 20 as in FIGS. 5A-B and 7A-B must be somewhat smaller than, and preferably a small fraction of, the dimension of the expected size of the smallest interference zone of the gas reservoir 18. Also if it is not known in which direction, to right or left, for example, of the borehole is the expected position of the gas zone, it will be necessary to have a plurality of arrays, such as that shown along the line 32, but arranged on different radial lines such as 32A, 32B, 32D and so on. It will be clear also that for best results the angular spacing of the radial arrays 32 should be related to the expected diameter of the smallest interference zone of the gas pool 18.

Refer again to FIGS. 5A-B. Knowing the positions A and B of the source 40 in the borehole at at least two different depths $d_1$ and $d_2$ and knowing the lateral positions of the geophones along the line 32 on the surface and the specific directions of the bounding rays 301A, 301B, 303A, 303B and 305A, 305B, 307A, 307B of the two interference zones caused by the gas reservoir 18, it is possible to determine the position of zone 18. The interference zones are determined from the signals received by the geophones 20 from the source A and from the signals received by the geophones 20 from the position B of the source, and so on. Much more data and more accurate pinpointing can be achieved by obtaining measurements at a number of depths.

In FIGS. 5A-B and 7A-B one embodiment of this invention is shown in which the seismic source is a tricone rock bit which produces a high level of seismic noise of wide frequency band, but containing specific sharply tuned harmonic signals such as, for example, the 3rd harmonic frequency of the frequency of rotation of the drill bit.

Two systems of processing the data are shown in FIGS. 5A-B and 7A-B. One system uses a series of band pass filters 26 tuned to the 3rd harmonic or other harmonic signal. Such signal might be, for example, 5 Hertz, corresponding to the 3rd harmonic of a drill stem rotation of 100 revolutions per minute. Other harmonics could similarly be used by appropriately tuning the band pass filters. The other system employs spectrum analyzers.

The first system is shown in FIGS. 5A-B. The sensors or geophones 20 are connected through a multiconductor cable 22 to a plurality of conventional amplifiers 24. The outputs of the amplifiers 24 are applied through leads 25 to a plurality of narrow band pass filters 26 which pass signals at the frequency of the seismic source or a harmonic thereof. These signals are then sent to a recorder 28 for storage. The stored signals can be retrieved for processing as, for example, by comparison of the amplitudes.

The preferred embodiment of the invention is shown in FIGS. 7A-B. In this embodiment, the multiconductor cable 22 is connected to a plurality of amplifiers 25 which, in turn, have their outputs applied to a plurality of spectrum analyzers 43 which provide at their output displays 47 of signal power as a function of frequency. Spectral peaks indicate power received at the various harmonic seismic source frequencies. The areas under the peaks are indicative of the strengths of the harmonic signal powers received and thereby also indicate the interference zones by showing appropriate signal amplitude variations from the geophones in the interference zone as compared to the geophones not in the interference zone. In this method, use of band pass filters is not necessary since the spectrum analyzer displays the signal power density as a function of frequency and provides outputs representative thereof. This method using spectrum analyzers has a practical advantage over the method using band pass filters since the latter must be tuned to an appropriate harmonic of the drill shaft turning frequency. Since the turning rate of the drill string varies considerably over time, the spectrum analyzer, which is tuned to all frequencies simultaneously within a preselected band of frequencies, will always receive the signal whereas the band pass filter will only receive the signal when it is properly tuned to the signal frequency. The only advantage of the tuned band pass filter approach is lower cost of implementation.

The individual outputs from the spectrum analyzers may be stored by a set of recorders 45 whereby the spectral outputs can later be reproduced for analysis as, for example, by measuring the power under the peaks above the background or baseline, or by comparison of the signals with one another to thereby identify the geophones or receivers in the interference zone.

Modern spectrum analyzers, such as those commercially available on the market and made by Hewlett-Packard, General Radio Co., Nicolet, and others, can perform the digital Fourier transform calculations which form the basis of the spectral analysis. Furthermore, they have the ability to store the power spectrum taken from a first block of N data samples so that it may be averaged with the power spectrum taken from a subsequent data block. Averaging or stacking over many data blocks, generally called ensemble averaging, is easily done with modern commercially available equipment. The effect is an enhancement of signal-to-noise power ratio, which is a function of the number of spectra averaged. Weak signals buried in noise can be readily detected in most cases.

Geophone outputs containing weak third harmonic signals buried in noise have been detected by this means. A typical result is illustrated in FIG. 8. Signal strength is indicated by the area of the third harmonic peak 92 above the noise background energy level 90. The peak 92 shown in FIG. 8 corresponds to a third harmonic frequency of 5 Hz which, in turn, corresponds to a drill stem rotational speed of 100 RPM. The spectral peak is spread somewhat because the shaft RPM at the bit fluctuates slightly about the mean RPM. This is caused by torque fluctuations on the bit as it bores into the earth, reacting upon the drill stem which acts like a very long torsional spring. In addition to the third harmonic signal, other harmonics are often present and they also can be useful in signal detection, as is the third harmonic signal. FIG. 8 is a typical averaged power spectrum of geophone output containing third harmonic signal plus background earth noise. By comparing the spectral peaks taken at various locations, it is possible to identify the interference zone caused by a gas pool.

It should be realized that all of the digital spectral analyzers and memory functions illustrated could also be performed by a suitably programmed digital computer.

While the invention has been described with a certain degree of particularity, it is manifest that many changes may be made in the details of construction and the arrangement of components. It is understood that the invention is not to be limited to the specific language used or the specific embodiments set forth herein by way of exemplifying the invention, but the invention is to be limited only by the scope of the attached claim or claims, including the full range of equivalency to which each element or step thereof is entitled.

What is claimed is:

1. Apparatus for determining while drilling in the earth with a drill bit the position of a gas-saturated porous rock in the vicinity of the borehole, said drill bit serving to generate seismic waves of selected characteristics as it drills the borehole in the earth comprising:
    (a) a plurality of seismic wave sensors positioned in the earth near the surface thereof, at a plurality of known positions with respect to said borehole;
    (b) said seismic wave sensors adapted to receive the seismic waves generated by said drill bit which travel directly to the sensors and in certain positions both seismic waves which travel directly from the drill bit and seismic waves from the drill bit which are reflected from the gas-saturated porous rock to produce an electrical signal facsimile at each location corresponding to the received seismic waves whereby to generate an interference signal when the sensor receives both direct and reflected seismic waves, said interference signals serving to indicate a gas-saturated porous rock formation, and means including frequency selection means connected to receive the electrical signal facsimile at each location of a selected harmonic at the rate of rotation of said drill bit and provide said interference output signals.

2. Apparatus as in claim 1 wherein said means including frequency selection means includes filters tuned to a frequency representative of a harmonic of the drill bit rotational velocity for receiving the signals from the sensors and providing said output signals at the bandpass frequency of said filters.

3. Apparatus as in claim 1 wherein said means including frequency selection means includes a spectrum analyzer for providing said output signals.

4. The method of determining while drilling the position of a gas-saturated porous rock formation in the vicinity of a borehole in the earth comprising the steps of:
    (a) drilling the borehole in the earth with a rotary drill bit which generates while rotating almost periodic seismic waves;
    (b) detecting such almost periodic seismic waves at a plurality of selected positions on the surface of the earth, said detected seismic waves including at all positions seismic waves which travel from the drill bit directly to the surface of the earth, and at certain other positions, additionally seismic waves which are reflected from a gas-saturated porous rock formation in the earth at a depth greater than the location of the drill bit and which travel to the surface of the earth;
    (c) simultaneously generating from said detected seismic waves at a given depth an electrical facsimile signal at a harmonic of said periodic seismic waves at said selected positions, said facsimile signal corresponding to the detected direct seismic waves or the combined direct and reflected seismic waves, whereby said signal at said certain other positions is an interference signal; and
    (d) comparing said facsimile signals at a given drill bit depth to find those which have anomalous energy to indicate an interference zone.

5. The method as in claim 4 including the additional steps of:
    (f) drilling at a second depth whereby the drill bit generates seismic waves at a second depth;
    (g) repeating steps (b), (c) and (d) for the seismic waves at the second depth to indicate an interference zone.

* * * * *